United States Patent
Otaka et al.

(10) Patent No.: US 8,085,000 B2
(45) Date of Patent: Dec. 27, 2011

(54) CHARGER INCLUDING A BIAS VOLTAGE APPLIED TO A RECTIFIER TO RECTIFY RECEIVED RADIO WAVES BASED ON RECTIFIER OUTPUT VOLTAGE

(75) Inventors: Shoji Otaka, Yokohama (JP); Toshiyuki Umeda, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 554 days.

(21) Appl. No.: 12/354,261

(22) Filed: Jan. 15, 2009

(65) Prior Publication Data

US 2009/0184690 A1   Jul. 23, 2009

(30) Foreign Application Priority Data

Jan. 22, 2008   (JP) ................. P2008-011673

(51) Int. Cl.
  *H02J 7/00* (2006.01)
(52) U.S. Cl. ........................... 320/137; 320/128
(58) Field of Classification Search .................. 320/101, 320/103, 128, 137, 166
  See application file for complete search history.

(56) References Cited

U.S. PATENT DOCUMENTS

| | | | |
|---|---|---|---|
| 7,084,605 B2 * | 8/2006 | Mickle et al. ................. | 320/101 |
| 7,424,265 B2 | 9/2008 | Umeda et al. | |
| 7,424,266 B2 | 9/2008 | Ootaka et al. | |
| 7,843,709 B2 * | 11/2010 | Umeda et al. .................... | 363/44 |
| 7,956,572 B2 * | 6/2011 | Zane et al. .................... | 320/108 |
| 2005/0104553 A1 * | 5/2005 | Mickle et al. ................. | 320/101 |
| 2005/0282505 A1 * | 12/2005 | Umeda et al. ................. | 455/100 |
| 2006/0128345 A1 * | 6/2006 | Ootaka et al. ................. | 455/333 |
| 2008/0080214 A1 * | 4/2008 | Umeda et al. .................. | 363/37 |
| 2009/0200985 A1 * | 8/2009 | Zane et al. .................... | 320/108 |

FOREIGN PATENT DOCUMENTS

| | | |
|---|---|---|
| JP | 2006-314181 | 11/2006 |
| JP | 2006-319863 | 11/2006 |

* cited by examiner

*Primary Examiner* — Edward Tso
*Assistant Examiner* — Manuel Hernandez
(74) *Attorney, Agent, or Firm* — Oblon, Spivak, McClelland, Maier & Neustadt, L.L.P.

(57) ABSTRACT

A charger includes: a rectifier to rectify a received radio wave to generate a charging current; a potential generator to generate a bias voltage setting an operating point of the rectifier; and a controller to supply the bias voltage generated by the potential generator when an output voltage of the rectifier is equal to or larger than a predetermined value.

9 Claims, 4 Drawing Sheets

CHARGER INCLUDING A BIAS VOLTAGE APPLIED TO A RECTIFIER TO RECTIFY RECEIVED RADIO WAVES BASED ON RECTIFIER OUTPUT VOLTAGE

CROSS-REFERENCE TO RELATED APPLICATIONS

This application is based upon and claims the benefit of priority from the prior Japanese Patent Application No. 2008-011673, filed on Jan. 22, 2008; the entire contents of which are incorporated herein by reference.

BACKGROUND

1. Field of the Invention

The present invention relates to a charger using radio technology, in particular, to a charger with enhanced charging efficiency.

2. Description of the Related Art

In recent years, so-called RF tags have been under active research and development. The RF tag is a non-contact data carrier that electronically reads and updates package information by using radio technology. In recent years, an RF tag which is combined with a sensor and can read information obtained by the sensor has also been developed. The sensor requires to be equipped with a battery since power supplied by radio transmission is not enough for its operation.

The battery mounted in the RF tag is desirably a charging-type battery in view of the life and usage form of the RF tag. Therefore, there has been proposed a method of charging a battery on a RF tag by using radio power transmission. Generally, in the radio power transmission, a transmission loss is large and therefore, it is a significant issue how the power is transmitted efficiently to charge the battery. A charger using the radio technology is disclosed in, for example, JP-A 2006-314181(KOKAI).

SUMMARY

As described above, conventional chargers have a problem of low charging efficiency. The present invention was made to solve such a problem and its object is to provide a charger realizing highly efficient charging.

To attain the aforesaid object, a charger according to an aspect of the present invention includes: a rectifier to rectify a received radio wave to generate a charging current; a potential generator to generate a bias voltage setting an operating point of the rectifier; and a controller to supply the bias voltage generated by the potential generator when an output voltage of the rectifier is equal to or larger than a predetermined value. A charger according to another aspect of the present invention includes: an antenna to receive a charging radio wave; a rectifier to rectify the charging radio wave to generate a charging current for charging a battery; a potential generator to generate a bias voltage for offsetting a threshold voltage above which the rectifier starts generating the charging current, and supplying the bias voltage to the rectifier upon receipt of a timing signal; a transfer controller to generate the timing signal upon receipt of activation control to supply the timing signal to the potential generator; and a switch controller to give the activation control to the transfer controller when an output voltage of the rectifier becomes equal to or larger than a predetermined value.

DETAILED DESCRIPTION

As result of rectification and detection of a radio wave received by an antenna, a DC current can be obtained. That is, a charger supplying power by radio transmission can be realized if it rectifies a radiowave received from a radiowave sender and supplies the obtained DC current to a chargeable battery.

A diode element (including a semiconductor element such as a transistor used as a diode) used for the rectification has a property that a current does not flow therethrough unless a forward voltage reaches a certain level or higher. Therefore, when the radio wave received by the antenna is weak and thus the forward voltage (output voltage of the element) at the certain level or higher cannot be obtained, a sufficient charging current cannot be obtained, resulting in deteriorated efficiency of the whole charger. In a charger according to an embodiment of the present invention, a voltage applied to the diode element used for the rectification is increased to offset a threshold voltage above which the charging current starts to flow, thereby generating the output voltage and charging current which are sufficiently high even when the radio wave is feeble.

However, increasing the voltage applied to the diode element means that power for this purpose is required. The charging power that should be obtained from the radio wave which is rectified for charging is small, and therefore, an excessive voltage increase would lower charging efficiency instead of enhancing it. Therefore, in the charger according to the embodiment of the present invention, the increase in the charging voltage is controllable.

Hereinafter, one embodiment of the present invention will be described in detail with reference to the drawings.

Figure 1:
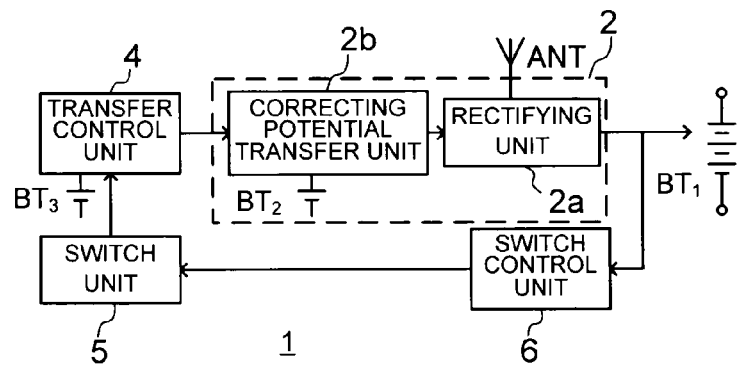
FIG. 1 is a block diagram showing a charger according to an embodiment.

As shown in FIG. 1, the charger 1 of this embodiment includes a gain control/rectifying unit 2 to which an antenna ANT is connected, a transfer control unit 4, a switch unit 5, and a switch control unit 6.

The gain control/rectifying unit 2 is a rectifier which has a rectifying unit 2a and a correcting potential transfer unit 2b and whose rectification efficiency is controllable. In the description below, when the term "gain" is used, it includes a degree to which a charging current is efficiently obtained. The gain control/rectifying unit 2 has the rectifying unit 2a subjecting a radio wave received from the antenna ANT to rectification, thereby generating a DC current. The rectifying unit 2a includes a diode element or a semiconductor element (rectifying element) such as a transistor functioning as a diode element, and has a function of subjecting an AC reception signal to full-wave rectification. The correcting potential transfer unit 2b has a function of increasing a forward voltage by supplying the rectifying unit 2a with an offset voltage (a threshold voltage indicating a forward voltage threshold value above which a forward current starts to flow) for the rectifying element of the rectifying unit 2a, thereby increasing a gain of the rectifier so that a charging current can be obtained even when the forward voltage is low. That is, with the rectifying unit 2a and the correcting potential transfer unit 2b, the gain control/rectifying unit 2 can highly efficiently convert the reception signal received from the antenna ANT into the charging current.

Figure 2:
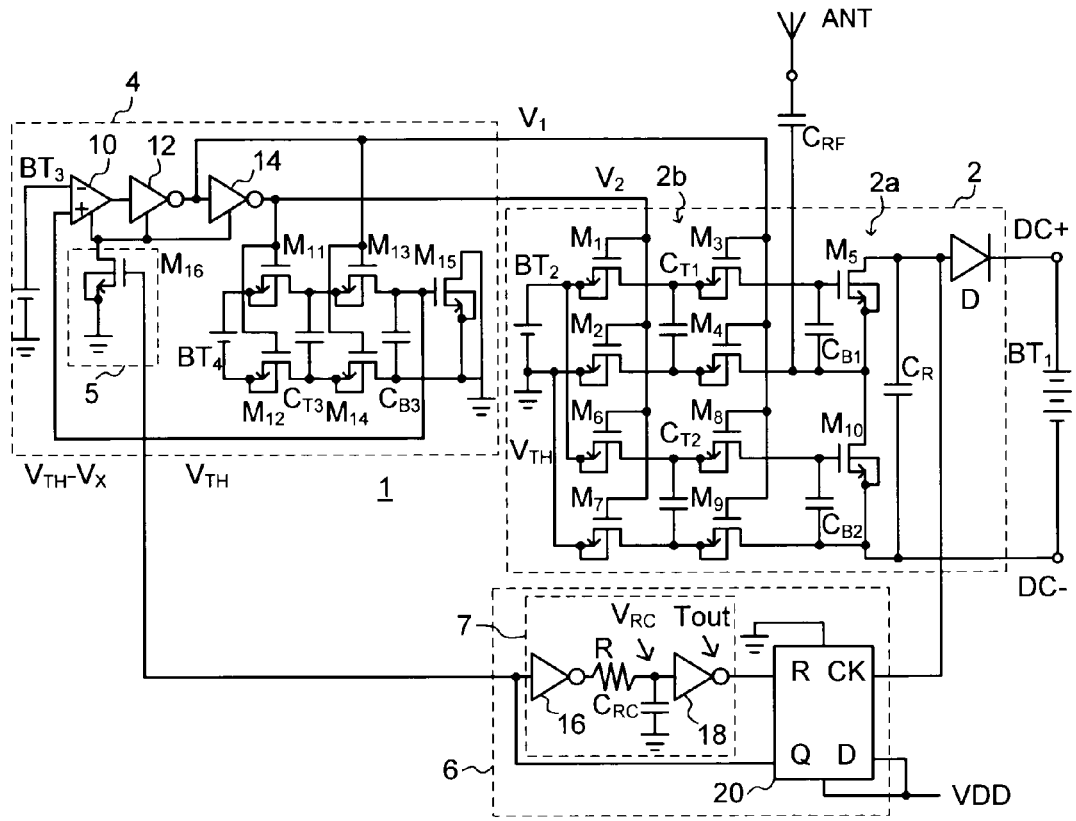
FIG. 2 is a circuit diagram showing a concrete structure example of the charger according to this embodiment.

As shown in FIG. 2, the rectifying unit 2a of this embodiment has a pair of MOSFETs $M_5$ and $M_{10}$ (hereinafter, simply referred to as "$M_5$" and the like) whose source and drain are connected to each other. The antenna ANT is connected to a connection point of the source of $M_5$ and the drain of $M_{10}$ via a DC blocking capacitor $C_{RF}$. Between a gate and the source of $M_5$ and between a gate and a source of $M_{10}$, potential holding capacitors $C_{B1}$ and $C_{B2}$ are connected respectively. Between a drain of $M_5$ and the source of $M_{10}$, a capacitor $C_R$ for stabilizing a charging voltage is connected. Further, the drain of $M_5$ is connected to a cathode of a battery $BT_1$ which is to be charged, via a backflow preventing diode D which is forward-connected, and the source of $M_{10}$ is similarly connected to an anode of the battery $BT_1$. That is, the battery $BT_1$ which is to be charged is given a positive potential from the drain of $M_5$ and given a negative potential from the source of $M_{10}$.

The correcting potential transfer unit 2b includes a battery $BT_2$ giving an offset voltage $V_{TH}$ for $M_5$ and $M_{10}$ as a bias voltage, and supplies a correcting potential to $M_5$ and $M_{10}$. Concretely, a source of a MOFET $M_1$ is connected to a cathode of the battery $BT_2$ and a source of a MOSFET $M_2$ is connected to an anode of the battery $BT_2$. Gates of $M_1$ and $M_2$ are given a later-described timing potential $V_2$, and a potential holding capacitor $C_{T1}$ is connected between drains of $M_1$ and $M_2$. Further, sources of MOSFETs $M_3$ and $M_4$ are connected to the drains of $M_1$ and $M_2$ respectively. As in $M_1$ and $M_2$, gates of $M_3$ and $M_4$ are given a later-described timing potential $V_1$. Drains of $M_3$ and $M_4$ are connected to both ends of a capacitor $C_{B1}$.

Similarly, a source of a MOFET $M_6$ is connected to the cathode of the battery $BT_2$, and a source of a MOSFET $M_7$ is connected to the anode of the battery $BT_2$. Gates of $M_6$ and $M_7$ are given the later-described timing potential $V_2$, and a potential holding capacitor $C_{T2}$ is connected between drains of $M_6$ and $M_7$. Further, sources of MOSFETs $M_8$ and $M_9$ are connected to the drains of $M_6$ and $M_7$ respectively. As in $M_6$ and $M_7$, gates of $M_8$ and $M_9$ are given the later-described timing potential $V_1$. Drains of $M_8$ and $M_9$ are connected to both ends of a capacitor $C_{B2}$.

The timing potentials $V_1$ and $V_2$ are given as pulse signals which are opposite in phase. When $M_1$, $M_2$, $M_6$, and $M_7$ are on, $M_3$, $M_4$ $M_8$, and $M_9$ turn off, so that the capacitors $C_{T1}$ and $C_{T2}$ are charged with a potential of the battery $BT_2$. That is, $C_{T1}$ and $C_{T2}$ are charged with electric charges from a power source of $BT_2$, so that a voltage applied across both ends of $C_{T1}$, $C_{T2}$ becomes equal to a voltage applied across both ends of $BT_2$. Hereinafter, the expression "charged with the potential" will be sometimes used provided that it causes no misunderstanding. On the other hand, when $M_1$, $M_2$, $M_6$, and $M_7$ are off, $M_3$, $M_4$, $M_8$, and Mg turn on, so that the potentials of the capacitors $C_{T1}$ and $C_{T2}$ are discharged to be transferred to the capacitors $C_{B1}$ and $C_{B2}$. The potentials transferred to the capacitors $C_{B1}$ and $C_{B2}$ are given between the gate and source of $M_5$ and between the gate and source of $M_{10}$ respectively, thereby increasing forward voltages of $M_5$ and $M_{10}$. In the charger of this embodiment, the operations described above can increase rectification efficiency.

Figure 3:
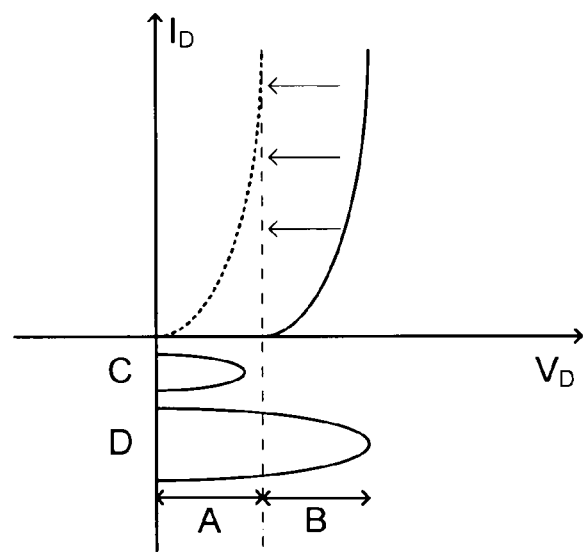
FIG. 3 is a chart to explain a correcting potential of the charger according to this embodiment.

Hereinafter, the significance of increasing the forward voltage will be described with reference to FIG. 3. As shown in FIG. 3, in the diode element used as the rectifier, a forward current $I_D$ does not start flowing unless a forward voltage $V_D$ at a certain level or higher (offset voltage: A in FIG. 3) is applied. Therefore, when a voltage amplitude of the reception signal has a voltage value, such as C in FIG. 3, falling within the region A in FIG. 3, the forward current $I_D$ does not flow (a sufficient output voltage contributing to the charging is not generated) and thus a charging current is not generated. On the other hand, when the voltage amplitude of the reception signal has a value such as D in FIG. 3 exceeding the offset voltage, the charging current is generated. However, even when the charging current is generated from the reception signal with D in FIG. 3, only a voltage in the region B in FIG. 3 exceeding the offset voltage contributes to the generation of the charging current. Therefore, it cannot be said that the reception signal is converted into an effective charging current. That is, charging efficiency is deteriorated.

In the charger of this embodiment, an offset voltage is added to the reception signal for the purpose of offsetting, thereby making an $I_D$-$V_D$ characteristic equivalent to the characteristic shown by the broken line in FIG. 3. This makes it possible to convert the reception signal into the charging current without any loss.

The transfer control unit 4 generates the timing potentials $V_1$ and $V_2$ triggering the correcting potential transfer unit 2b to transfer the potential. Since the voltage added as the offset voltage is the voltage with which the capacitors $C_{B1}$ and $C_{B2}$ are charged as previously described, periodical re-charging is necessary. The timing potentials $V_1$ and $V_2$ are applied as the pulse signals opposite in phase to $M_1$, $M_2$, $M_6$, $M_7$ and $M_3$, $M_4$, $M_8$, $M_9$ respectively of the correcting potential transfer unit 2b, and work to cause the transfer of the potentials from the battery $BT_2$ to the capacitors $C_{B1}$ and $C_{B2}$ via the capacitors $C_{T1}$ and $C_{T2}$.

As shown in FIG. 2, the transfer control unit 4 has a battery $BT_4$, $M_{11}$ to $M_{15}$, $C_{T3}$, and $C_{B3}$ corresponding to the battery $BT_2$, $M_1$ to $M_5$, $C_{T1}$, and $C_{B1}$ respectively, and the former and the latter are in substantially the same connection structure. A drain and a source of $M_{15}$ are both connected to a ground. The transfer control unit 4 further has an error amplifier 10, inverters 12 and 14, a battery $BT_3$, and a MOSFET $M_{16}$.

The error amplifier 10 is an amplifier having an inverting input (− input) to which a cathode of the battery $BT_3$ whose anode is grounded is connected, and a non-inverting input (+ input) to which a gate of $M_{15}$ is connected. An output of the error amplifier 10 is connected to an input of the inverter 12, and an output of the inverter 12 is connected to an input of the inverter 14. The output of the inverter 12 is connected as the timing potential $V_1$ to gates of $M_3$, $M_4$, $M_8$, and $M_9$, and an output of the inverter 14 is connected as the timing potential $V_2$ to gates of $M_1$, $M_2$, $M_6$, and $M_7$. The error amplifier 10 and negative power sources of the inverters 12 and 14 are connected to a drain of a MOSFET $M_{16}$ whose source is grounded. That is, a control signal applied to a gate of $M_{16}$ controls the operations of the error amplifier 10 and the inverters 12 and 14.

$BT_4$, $M_{11}$ to $M_{15}$, $C_{T3}$, and $C_{B3}$ imitate the gain control/rectifying unit 2. A potential of the battery $BT_4$ having the offset voltage $V_{TH}$ is transferred to the capacitor $C_{B3}$ via the capacitor $C_{T3}$ when $M_{11}$, $M_{12}$ and $M_{13}$, $M_{14}$ are turned on and off respectively by the timing potentials $V_1$ and $V_2$. The potential transferred to the capacitor $C_{B3}$ is applied between a gate and a source of $M_{15}$. The error amplifier 10 compares the gate/source voltage of $M_{15}$ and a potential ($V_{TH}$−$V_X$) of the battery $BT_3$.

When the gate/source voltage of $M_{15}$ becomes equal to or lower than a predetermined voltage due to a leakage current of $M_{15}$, the error amplifier 10 operates to re-inject electric charges from the potential $V_{TH}$ of the battery $BT_4$ to $C_{B3}$ via $C_{T3}$. At this time, the error amplifier 10 and the inverters 12, 14 generate the timing potentials $V_1$ and $V_2$.

In this manner, the transfer control unit 4 of this embodiment generates the timing potentials $V_1$ and $V_2$ at a predetermined timing to give the generated timing potentials $V_1$ and $V_2$, thereby operating so as to refresh the offset voltage. A usable example as the transfer control unit 4 is a ring oscillator or the like.

The switch control unit 6 controls the switch unit 5 turning on/off the operation of the transfer control unit 4. The transfer control unit 4 controls the refreshing of the offset voltage of the gain control/rectifying unit 2, but under the circumstances where the radio wave received by the antenna ANT is weak and thus the charging current is low, charging efficiency is deteriorated all the more unless power consumption of the gain control/rectifying unit 2 is reduced. Therefore, the switch control unit 6 monitors the charging current and operates to control the switch unit 5 so that the transfer control unit 4 operates only for a predetermined time period when the charging current becomes a predetermined value.

Concretely, the switch control unit 6 has a timer 7 and a flipflop circuit (FF) 20. The timer 7 has an inverter 16, a resistor R whose one end is connected to an output of the inverter 16, a capacitor $C_{RC}$ whose one end is connected to the other end of the resistor R and whose other end is grounded, and an inverter 18 whose input is connected to the other end of the resistor R. That is, the timer 7 includes an integrator made up of the resistor R and the capacitor $C_{RC}$. An input of the inverter 16 is connected to the gate of $M_{16}$ forming the switch unit 5.

The FF 20 is formed by, for example, a D-type FF circuit or the like, and has terminals, namely, an input D connected to a power source VDD, a reset R connected to an output of the inverter 18, an output Q connected to the input of the inverter 16, and a clock CK connected to the drain of $M_5$. When "H" is input to D and "L" is input to R, the FF 20 outputs "H" from Q in response to an input "H" to CK. When "H" is input to R of the FF 20 in this state, the state is cleared and the FF 20 operates to output "L" from Q.

The switch control unit 6 is supplied with power from a battery (VDD) which is to be charged. Further, a circuit forming the switch control unit 6 is made up of digital circuits such as CMOS inverters and a flipflop and an analog circuit without any through current, and is structured to consume negligibly small power.

Figure 4:
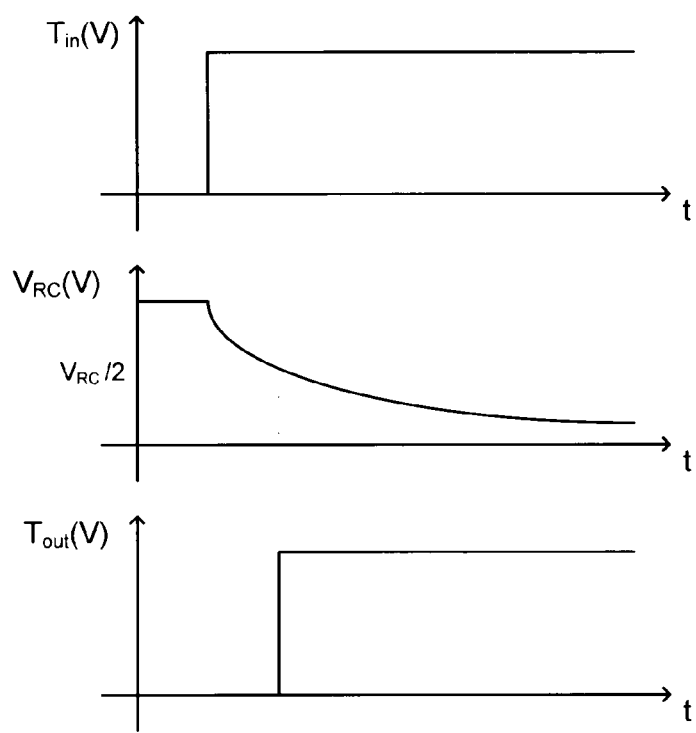
FIG. 4 is a chart showing an operation example of a timer in a switch control unit of this embodiment.

Here, the operation of the timer 7 of this embodiment will be described with reference to FIG. 4. The timer 7 has a time constant determined by the resistor R and the capacitor $C_{RC}$. If a voltage represented by $T_{in}$ in FIG. 4 is applied to the input of the inverter 16 (the upper chart in FIG. 4), an input voltage of the inverter 18 starts to slowly decrease at a rising edge of $T_{in}$ (the middle chart in FIG. 4). If a threshold value of the voltage at the input of the inverter 18, based on which "H" or "L" is output is a ½ voltage of "H", an output $T_{out}$ of the inverter 18 becomes "H" when an input voltage $V_{RC}$ of the inverter 18 becomes ½ of the H state (the lower chart in FIG. 4). That is, the timer 7 operates to reset the FF 20 by inputting "H" to R of the FF 20 after a predetermined time has passed from an instant when the "H" is input to the inverter 16. It should be noted that the timer 7 is not limited to an analog timer using the integrator as descried above, but the timer may be realized by a digital circuit.

Figure 5:
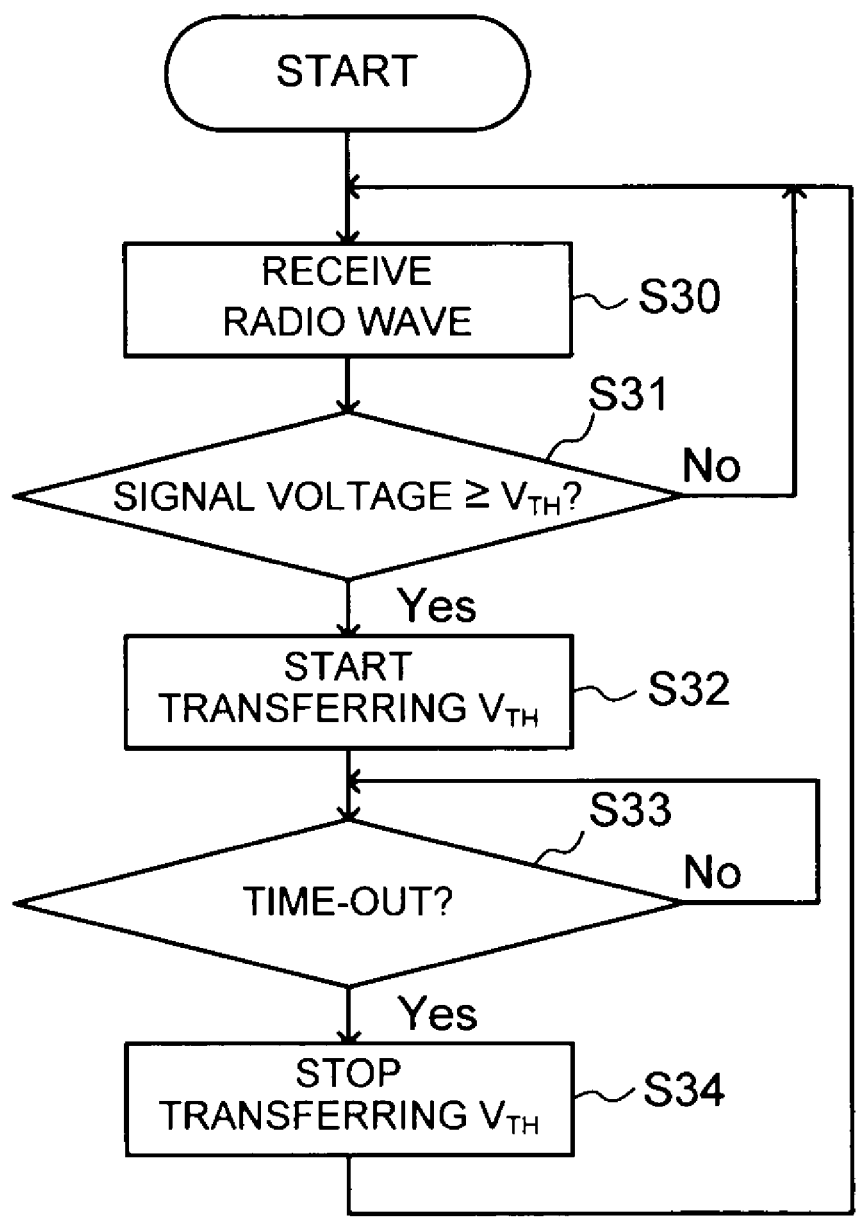
FIG. 5 is a chart showing the operation of the switch control unit of this embodiment.

Next, the operation of the switch control unit 6 of the charger of this embodiment will be described with reference to FIG. 5. When the rectifying unit 2a receives a radio wave (Step 30. Hereinafter, referred to as "S30" or the like), $M_5$ and $M_{10}$ rectify a reception signal to generate a DC charging current. Here, when a radio wave detection voltage of $M_5$ and $M_{10}$ (output voltage of $M_5$ and $M_{10}$) is smaller than $V_{TH}$, no charging current is generated since the offset voltage cannot be exceeded (No at S31).

When the radio wave detection voltage is equal to or higher than $V_{TH}$, that is, when the received radio wave has a predetermined intensity or higher (for example, about −5 dBm or higher) (Yes at S31), $M_5$ and $M_{10}$ start generating the charging current, and "H" is input to CK of the FF 20. Here, since the input D of the FF 20 is connected to VDD, "H" is output at the output Q when "H" is input to CK. As a result, a voltage is applied to the gate of $M_{16}$ forming the switch unit 5 and $M_{16}$ turns on, so that the error amplifier 10 and the inverters 12 and 14 start their operations. When the error amplifier 10 and the inverters 12 and 14 start their operations, the timing potentials $V_1$ and $V_2$ are given to the correcting potential transfer unit 2b, so that the potential of the offset voltage $V_{TH}$ is transferred to $C_{B1}$ and $C_{B2}$ via the capacitors $C_{T1}$ and $C_{T2}$ (S32). As a result, the reception signal input to $M_5$ and $M_{10}$ is efficiently converted into the charging current.

When the output Q becomes "H", the input of the inverter 16 of the timer 7 also becomes "H". As a result, the inverter 18 of the timer 7 inputs "H" to R of the FF 20 after a predetermined time has passed. When "H" is input to R of the FF 20, the state is reset (Yes at S33), and the output Q becomes "L". Accordingly, $M_{16}$ forming the switch unit 5 turns off, so that the error amplifier 10 and the inverters 12, 14 stop operating (S34).

Incidentally, if the radio wave continues to have a high intensity, the potential of the offset voltage $V_{TH}$ is transferred again, and the resetting in response to the time-out of the timer 7 is repeated. Here, the duration of the time-out of the timer 7 equals to, for example, the time required for one communication of a RF tag system or the like in which the charger of this embodiment is mounted, and is generally one second or less (about several tens msec).

As described above, according to the charger of this embodiment, since the correcting potential transfer unit 2b operates only when the received radio wave has a predetermined intensity or more, efficient charging takes place when the radio wave has a high intensity, and when the radio wave is weak, the charging operation itself including the transfer of the potential is stopped, which can reduce unnecessary power consumption.

Figure 6:
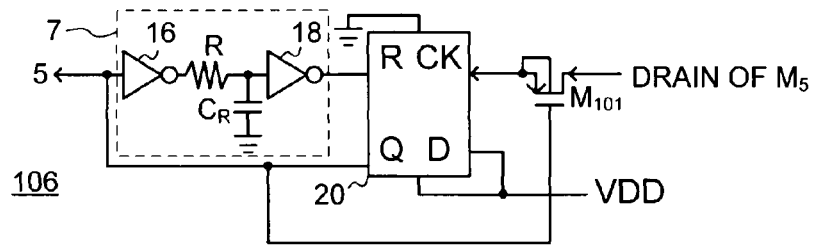
FIG. 6 is a block diagram showing another structure example of the switch control unit of this embodiment.

Next, a charger according to another embodiment will be described with reference to FIG. 6. In the charger of this embodiment, the structure of the switch control unit 6 is changed. Therefore, in the following description, the same elements as those in FIG. 2 will be denoted by the same reference numerals and symbols as those used in FIG. 2 and redundant description thereof will be omitted.

In a switch control unit 106 in the charger of this embodiment, an input signal to a clock CK of a FF 20 is controllable by a MOSFET $M_{101}$. As shown in FIG. 6, a source of $M_{101}$ is connected to CK of the FF 20, and a drain of $M_{101}$ is connected to the drain of $M_5$ of the rectifying unit 2a. Further, a gate of $M_{101}$ is connected to an output Q of the FF 20, that is, an output Q as an output for controlling the switch unit 5, and to the gate of $M_{16}$ which is a control target.

In the switch control unit 6 of this embodiment, when the rectifying unit 2a receives an intense radiowave, the output Q becomes "H", and $M_{16}$ of the switch unit 5 turns on and $M_{101}$ turns off. As a result, the output of the rectifying unit 2a and an input of the switch control unit 106 are disconnected from each other, which can prevent a parasitic element of an input stage of the switch control unit 106 (or FF 20) from consuming power supplied at the time of charging. When a timer 7 inputs "H" to R of the FF 20, $M_{101}$, turns on again to turn into a state of waiting for an input of a signal from the rectifying unit 2a. In addition, when an input load of CK of the switch control unit 106 (FF 20) is small (when an input impedance is small), consumption of a charging current by the switch control unit 106 can be reduced.

Figure 7:
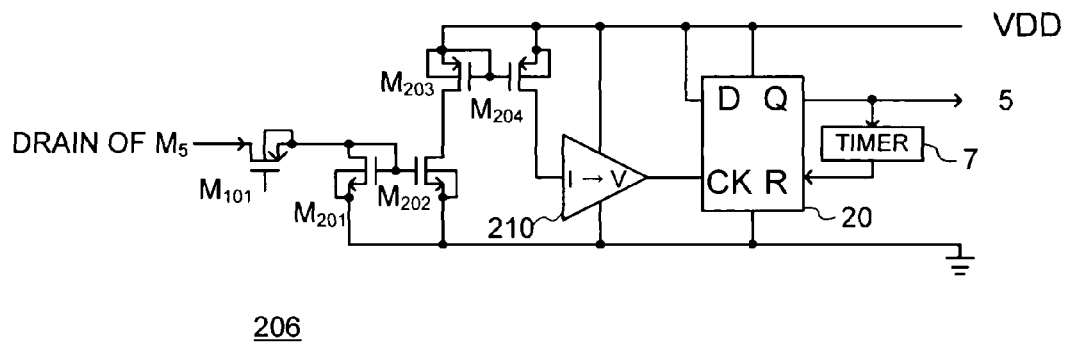
FIG. 7 is a block diagram showing still another structure example of the switch control unit of this embodiment.

Next, a charger according to still another embodiment will be described with reference to FIG. 7. In the charger of this embodiment, the structure of the switch control unit 6 is further changed. In the following description, the same elements as those in FIG. 2 will be denoted by the same reference numerals and symbols as those used in FIG. 2, and redundant description thereof will be omitted.

In a switch control unit 206 in the charger of this embodiment, an input signal to a clock CK of a FF 20 is controllable by a MOSFET $M_{101}$, and in addition, an amplifier amplifying the input signal to CK is further provided. As shown in FIG. 7, a drain of the MOSFET $M_{101}$ is connected to the drain of $M_5$ of the rectifying unit 2a, and a source of $M_{101}$ is connected to an input of a first current mirror unit made up of $M_{201}$ and $M_{202}$ (to a drain of $M_{201}$ and gates of $M_{201}$ and $M_{202}$). Sources of $M_{201}$ and $M_{202}$ are grounded, and an output of the first current mirror unit (drain of $M_{202}$) is connected to an input of a second current mirror unit made up of $M_{203}$ and $M_{204}$ (to a drain of $M_{203}$). Sources and gates of $M_{203}$ and $M_{204}$ are connected to the power source VDD, and an output of the second current mirror unit (drain of $M_{204}$) is connected to an input of a current-voltage converting unit 210. An output of the current-voltage converting unit 210 is connected to CK of the FF 20.

The first and second current mirror units operate to amplify the charging current sent from the drain of $M_5$. Incidentally, the number of the current mirror units may be at least one or more. A current mirror circuit has a characteristic of operating only when a current signal is input thereto, and therefore, even the connection of the power source VDD to the current mirror circuit is not accompanied by unnecessary power consumption. The current-voltage converting unit 210 is a converter converting current to voltage, and can be realized by, for example, a transistor or the like operating as a resistor or a current source. The charging current sent from the drain of $M_5$ passes through $M_{101}$ to be amplified by the current mirror units and is converted to voltage by the current-voltage converting unit 210 to be input to CK of the FF 20. Such a structure can enhance sensitivity of the switch control unit 206. The sensitivity (detection sensitivity) of the switch control unit 206 has an influence on the occurrence of difference between a timing at which the charging starts when the charging current is generated and a control timing of the switch unit 5 and $M_{101}$. Therefore, the higher the sensitivity of the switch control unit 206, the more the unnecessary power consumption can be reduced.

In the switch control unit 206 of this embodiment, it is important to shut off the charging current by $M_{101}$. This is because the switch control unit 206 consumes the charging current generated by $M_5$ due to a low input impedance of the current mirror circuit. According to the switch control unit 206 of this embodiment, it is possible to reduce the unnecessary power consumption because $M_{101}$ which is a MOSFET disconnects the input of the current mirror circuit.

Figure 8:
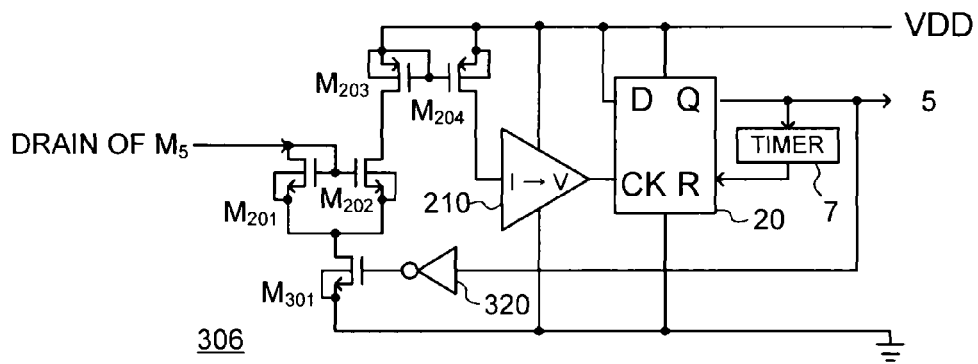
FIG. 8 is a block diagram showing yet another structure example of the switch control unit of this embodiment.

Next a charger according to yet another embodiment will be described with reference to FIG. 8. In the charger of this embodiment, the structure of the switch control unit 6 is further changed. In the following description, the same elements as those in FIG. 2 will be denoted by the same reference numerals and symbols as those used in FIG. 2, and redundant description thereof will be omitted.

In a switch control unit 306 in the charger of this embodiment, an amplifier amplifying an input signal to a clock CK of a FF 20 is further provided and the operation of the amplifier is controllable. As shown in FIG. 8, the charging current sent from the drain of $M_5$ is directly input to an input of a first current mirror unit made up of $M_{201}$ and $M_{202}$ (to a drain and a gate of $M_{201}$). Functions and connection relation of the first and second current mirror units and a current-voltage converting unit 210 are the same as those in the example shown in FIG. 7. What is different from the example shown in FIG. 7 is that, in place of $M_{101}$ connected to the input of the first current mirror unit, a MOSFET $M_{301}$ is provided whose drain is connected to sources of $M_{201}$ and $M_{202}$ and whose source is grounded. An output of an inverter 320 is connected to a gate of $M_{301}$, and an output Q of the FF 20 is connected to an input of the inverter 320.

In the switch control unit 306 of this example, when a radio wave received by the rectifying unit 2a is intense and a charging current is generated, the output Q of the FF 20 becomes "H" and $M_{16}$ of the switch unit 5 turns on, so that the potential of the offset voltage is transferred. On the other hand, a logic value of the output Q is inverted by the inverter 320 and $M_{301}$ turns off. Accordingly, a common source of the first current mirror unit turns into a floating state, so that the operations of the first and second current mirror units stop. Since the output Q is kept at "H" even when an input of CK becomes "L", the transfer of the potential is continued until the time-out of the timer 7, so that a state with a high charging gain is maintained. At the time of the time-out of the timer 7, the state of the FF 20 is reset, so that the output Q becomes "L", and thus $M_{16}$ of the switch unit 5 turns off. As a result, the transfer of the potential of the offset voltage stops, thereby decreasing a charging gain, which results in a power saving state.

According to the switch control unit 306 of this example, since the operation of the current mirror circuit is stopped by $M_{301}$ which is a MOSFET, unnecessary power consumption can be reduced.

As has been described hitherto, according to the chargers of the embodiments of the present invention, it is possible to realize high charging efficiency in charging using a charging current converted from a radio wave.

It should be noted that the present invention is not limited to the specific forms of the above-described embodiments, but the constituents elements can be modified without departing from the spirit thereof when the present invention is carried out. Further, various inventions can be formed by appropriate combination of a plurality of the constituent elements disclosed in the above-described embodiments. For example, some of the constituent elements may be deleted from all the constituent elements shown in the embodiments. Further, the constituent elements of different embodiments may be appropriately combined. According to the embodiments of the present invention, it is possible to enhance charging efficiency in charging by radio transmitted power.

What is claimed is:
1. A charger comprising:
a rectifier to rectify a received radio wave to generate a charging current;
a potential generator to generate a bias voltage setting an operating point of the rectifier; and a controller to supply the bias voltage generated by the potential generator when an output voltage of the rectifier is equal to or larger than a predetermined value.

2. The charger according to claim 1, wherein the controller stops supplying the bias voltage when a predetermined period has passed after the start of the supply of the bias voltage.

3. The charger according to claim 1, wherein the bias voltage corrects an input voltage-charging current characteristic of the rectifier.

4. The charger according to claim 1, wherein the potential generator comprises:
a voltage source to regulate the bias voltage;
a capacitor to hold the bias voltage of the voltage source;
a gate to turn on/off charging of the capacitor with the bias voltage from the voltage source; and
a transfer controller to control on/off of the gate at a predetermined timing, and
wherein the controller activates the transfer controller when the output voltage of the rectifier is equal to or larger than the predetermined value.

5. The charger according to claim 1, wherein the controller comprises a current mirror circuit to amplify the charging current.

6. The charger according to claim 4, wherein the controller further comprises a current mirror stopper to stop an operation of the current mirror circuit after the supply of the bias voltage.

7. The charger according to claim 1, wherein the controller further comprises a charging current stopper to stop the generation of the charging current after the supply of the bias voltage.

8. A charger comprising:
an antenna to receive a charging radio wave;
a rectifier to rectify the charging radio wave to generate a charging current for charging a battery;
a potential generator to generate a bias voltage for offsetting a threshold voltage above which the rectifier starts generating the charging current, and supplying the bias voltage to the rectifier upon receipt of a timing signal;
a transfer controller to generate the timing signal upon receipt of activation control to supply the timing signal to the potential generator; and
a switch controller to give the activation control to the transfer controller when an output voltage of the rectifier becomes equal to or larger than a predetermined value.

9. The charger according to claim 8, wherein the switch controller comprises:
a timer to regulate a supply time during which the bias voltage is supplied after the activation of the transfer controller; and
a switch to stop an operation of the transfer controller when the supply time has passed.

* * * * *